US009275361B2

(12) United States Patent
Meyer

(10) Patent No.: US 9,275,361 B2
(45) Date of Patent: Mar. 1, 2016

(54) OUT OF STOCK SENSOR

(71) Applicant: Tagnetics, Inc., Troy, OH (US)

(72) Inventor: Matthew Meyer, Versailles, OH (US)

(73) Assignee: Tagnetics, Inc., Troy, OH (US)

( * ) Notice: Subject to any disclaimer, the term of this patent is extended or adjusted under 35 U.S.C. 154(b) by 0 days.

(21) Appl. No.: 14/152,644

(22) Filed: Jan. 10, 2014

(65) Prior Publication Data

US 2014/0201041 A1 Jul. 17, 2014

Related U.S. Application Data

(60) Provisional application No. 61/751,649, filed on Jan. 11, 2013.

(51) Int. Cl.

| | |
|---|---|
| ***G01G 19/413*** | (2006.01) |
| ***G01G 19/414*** | (2006.01) |
| ***G01G 19/42*** | (2006.01) |
| ***G06Q 10/08*** | (2012.01) |

(52) U.S. Cl.

CPC ............ *G06Q 10/087* (2013.01); *G01G 19/413* (2013.01); *G01G 19/414* (2013.01); *G01G 19/4144* (2013.01); *G01G 19/42* (2013.01); *Y04S 10/56* (2013.01)

(58) Field of Classification Search

None

See application file for complete search history.

(56) References Cited

U.S. PATENT DOCUMENTS 4,447,885 A * 5/1984 Biss .............................. 702/129
5,537,126 A 7/1996 Kayser et al.
5,736,967 A 4/1998 Kayser et al.
5,750,937 A * 5/1998 Johnson ............. G01G 23/3707 177/199
5,837,952 A * 11/1998 Oshiro et al. ............... 200/86 R
5,986,221 A * 11/1999 Stanley ......................... 177/136
6,249,263 B1 6/2001 Kayser et al.
6,271,807 B1 8/2001 Kayser et al.
6,552,278 B2 * 4/2003 Johnson ............... G01G 19/021 177/134
6,844,821 B2 1/2005 Swartzel et al.
6,924,781 B1 8/2005 Gelbman
7,152,040 B1 * 12/2006 Hawthorne et al. ............. 705/16
7,279,645 B1 * 10/2007 Inglin .................. G01G 11/046 177/145
7,989,714 B2 * 8/2011 Kresina .................. 177/210 EM
2004/0034581 A1 2/2004 Hill et al.
2005/0027603 A1 * 2/2005 Green ............................ 705/22

(Continued)

FOREIGN PATENT DOCUMENTS

WO 2005/071623 A1 8/2005
WO WO 2005071623 A1 * 8/2005

OTHER PUBLICATIONS

International Searching Authority, International Search Report PCT/US14/11105 mailed Dec. 1, 2014, 1pg.
International Searching Authority, Written Opinion of the International Preliminary Examining Authority for corresponding application PCT/US14/11105 mailed Apr. 2, 2015, 2pgs.

*Primary Examiner* — Allen Chein
(74) *Attorney, Agent, or Firm* — Duane Morris LLP

(57) ABSTRACT

A weight sensing system for retail shelves includes multiple shelves having an electrical communication and power distribution system, and weight sensors located on the top surfaces of the shelves and coupled to the electrical communication and power distribution system for detecting the placement of retail products on the shelves. A controller monitors real-time at-the-shelf inventory and issues alerts when a retail product becomes out-of-stock, is anticipated to become out-of-stock, or is misplaced on a shelf. Collection of real-time inventory data enables comprehensive inventory control at the shelf and in storage areas.

16 Claims, 10 Drawing Sheets

(56) References Cited

U.S. PATENT DOCUMENTS

| | | | | |
|---|---|---|---|---|
| 2005/0171854 | A1* | 8/2005 | Lyon | 705/24 |
| 2006/0071774 | A1* | 4/2006 | Brown et al. | 340/522 |
| 2006/0164247 | A1 | 7/2006 | Overhultz et al. | |
| 2008/0183599 | A1 | 7/2008 | Hill et al. | |
| 2011/0241843 | A1* | 10/2011 | Marsanne et al. | 340/10.3 |
| 2011/0259960 | A1* | 10/2011 | Baarman et al. | 235/385 |
| 2014/0201041 | A1 | 7/2014 | Meyer | |
| 2014/0201042 | A1 | 7/2014 | Meyer | |

* cited by examiner

OUT OF STOCK SENSOR

CROSS-REFERENCE TO RELATED APPLICATIONS

This application claims priority from U.S. Provisional Patent Application No. 61/751,649, filed on Jan. 11, 2013, the entirety of which is incorporated herein by reference.

FIELD OF THE INVENTION

The present disclosure generally relates a system and apparatus for inventory control of retail products. More specifically, the present disclosure is directed to a system and apparatus that uses a weight sensor to measure inventory of retail products on the shelf of a retailer, tracks the purchasing of the retail products, captures inventory depletion rates, issues alerts and applies predictive algorithms to effectively manage inventory.

BACKGROUND

A perennial challenge among retailers around the world is effective inventory management. Although retailers bear the consequences of this challenge in the form of lost sales or eroded customer loyalty, the entire supply chain is implicated. A product may go out of stock at the retailer's shelf due to failure to replenish products at the shelf, improper volume control at the store, poor demand forecasting, problems with distributional logistics, and complications at the manufacturing center.

One manifestation of this challenge to effectively control inventory of retail products is the failure to detect and correct when a retail product is "out of stock" on a shelf. In the United States alone retailers lose an estimated 4% of annual sales due to this problem. Lost sales are only one aspect of this problem; customers also become frustrated when an product they need is not available, eroding customer satisfaction and loyalty to retailers.

In most retail stores, out of stocks are detected only when a store employee visually identifies that an product is no longer stocked on the shelf. The employee must then record the product needed, find the product in the storage or warehouse area of the store, and re-stock the product. This process is time-consuming, costly, and inefficient. The process is particularly inefficient because a substantial amount of time may pass between the last product being removed from the shelf and identification of the out of stock product by a store employee.

A second manifestation of this challenge is the overstocking of shelves in a retail store. Many retailers fail to optimize the allocation of shelf space for their products, resulting in some products being stocked on a shelf at a volume such that the product would not sell out for several days or even weeks. This practice creates an inventory glut of some products, which increases the inventory cost or holding cost of a retailer.

A third manifestation of the challenge of effective inventory management is out of place inventory. It is not uncommon for customers to change their purchasing decisions during shopping, sometimes returning products to shelves not designated for the returned product. This may result in lost inventory, spoilage, and/or and unnecessary restocking of the product.

There is thus a well-established desire in the field of retail inventory control to implement a new system or apparatus for improving the inventory control and management of retail products. More specifically, there is a demand among retailers for a system or apparatus capable of optimizing at-the-shelf inventory of retail products, predicting when an product may go out of stock, identifying out of place inventory, and notifying the retailer in sufficient time to avoid the problems associated with out of stock inventory identified above.

SUMMARY

In accordance with one embodiment, a weight sensing system is provided in a shelf system that supports products for sale in a retail store. The sensing system includes multiple shelves having an electrical communication and power distribution system, and weight sensors located on the top surfaces of the shelves and coupled to the electrical communication and power distribution system for detecting the placement of retail products on the shelves. Each sensor includes first and second arrays of electrical conductors on the upper surface of a shelf, portions of the conductors in the first and second arrays being positional vertically adjacent and slightly spaced from each other at multiple spaced locations throughout a selected area of the shelf surface. The conductors in at least one of the arrays are flexible so that the weight of a product on the shelf in the selected area presses a flexible conductor in at least one array into contact with the adjacent portion of a conductor in the other array. An electrical power source is coupled to the conductors for applying a voltage across the first and second arrays, and a controller detects when there is no current flowing between the first and second arrays because none of the adjacent portions of the conductors in the first and second arrays are in contact with each other.

In one implementation, the adjacent portions of the conductors are biased away from each other so that they do not contact each other in the absence of any weight on the upper conductor. For example, the conductors of the two arrays may be printed on a resilient polymeric sheet, with a spacer between the sheets so that the resilience of the sheets spaces the adjacent portions of the conductors from each other in the absence of any weight on the sheets.

In another implementation, an inventory control system is disclosed which monitors inventory levels and out of stock items, generates alert signals for retail store employees based on low inventory levels or out of stock conditions, measures depletion rates of products, and generates inventory reports.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
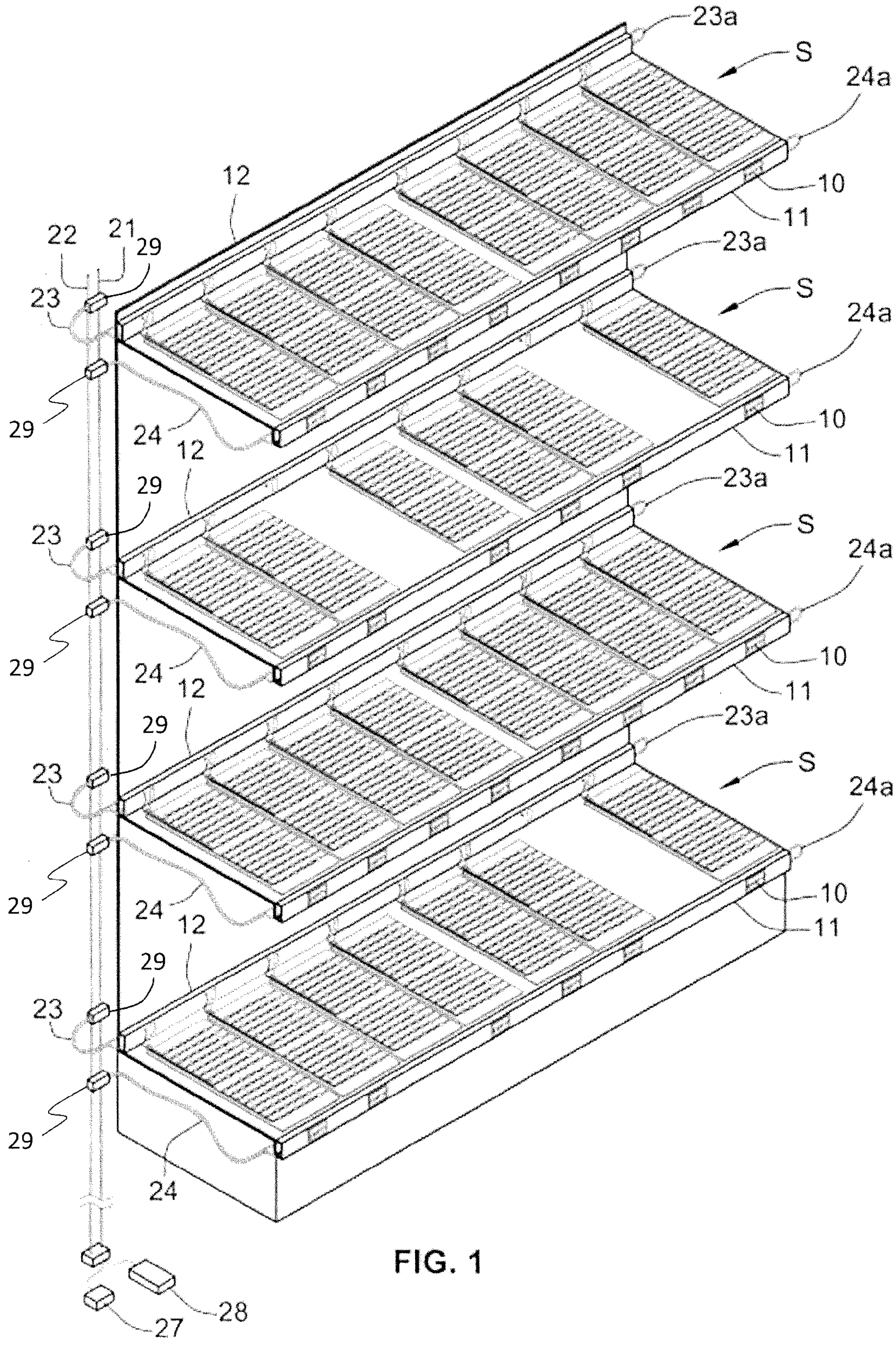
FIG. 1 is a front perspective of an exemplary configuration of a retail store shelf system in which each shelf includes one or more out-of-stock sensors coupled to an electrical power and communication system traversing the shelf.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The present disclosure is directed to a system and apparatus for inventory control of retail products. A weight sensor configured to be disposed on a retail shelf is operatively connected to a controller, which monitors retail product inventory based on the sensed product weight at the shelf.

FIG. 1 is a front perspective of one example of an inventory control system for retail products. FIG. 1 illustrates a bank of shelves S of the type typically used by retail stores for stocking and displaying a multiplicity of products to customers, in a manner that the customer can conveniently remove any selected product from the shelf on which that product is stocked. In the illustrated embodiment, each shelf S is equipped with an electrical communication and power distribution system that is coupled to electronic shelf labels 10 mounted on a rail 11 extending along the front edge of each shelf S and coupling coils mounted inside a rail 12 extending along the rear edge of each shelf S.

A pair of conductors 21 and 22 extending upwardly along the shelves S connect both an electrical power source 27 and a controller 28 to multiple connectors 29 spaced along the length of the conductors 21 and 22. A pair of connectors 29 is provided for each shelf S, for carrying both power and communication signals to a pair of loops 23*a* and 24*a* that extend along the rear and front edges, respectively, of each shelf S. These loops 23*a* and 24*a* function as a pair of primary windings electromagnetically coupled to multiple secondary windings 23*b* and 24*b* spaced along the length of respective rails 12 and 11 extending along the rear and front edges, respectively, of each shelf S. These primary and secondary windings form multiple transformers that couple both power and communication signals between the rear loop 23*a* and weight sensors 30 on the top surfaces of the shelves S, and between the front loop 24*a* and the electronic shelf labels 10 on the rails 11 on the front edges of the shelves S. These transformers are referred to as "inductive coupling" or "inductively coupled connections."

Figure 2:
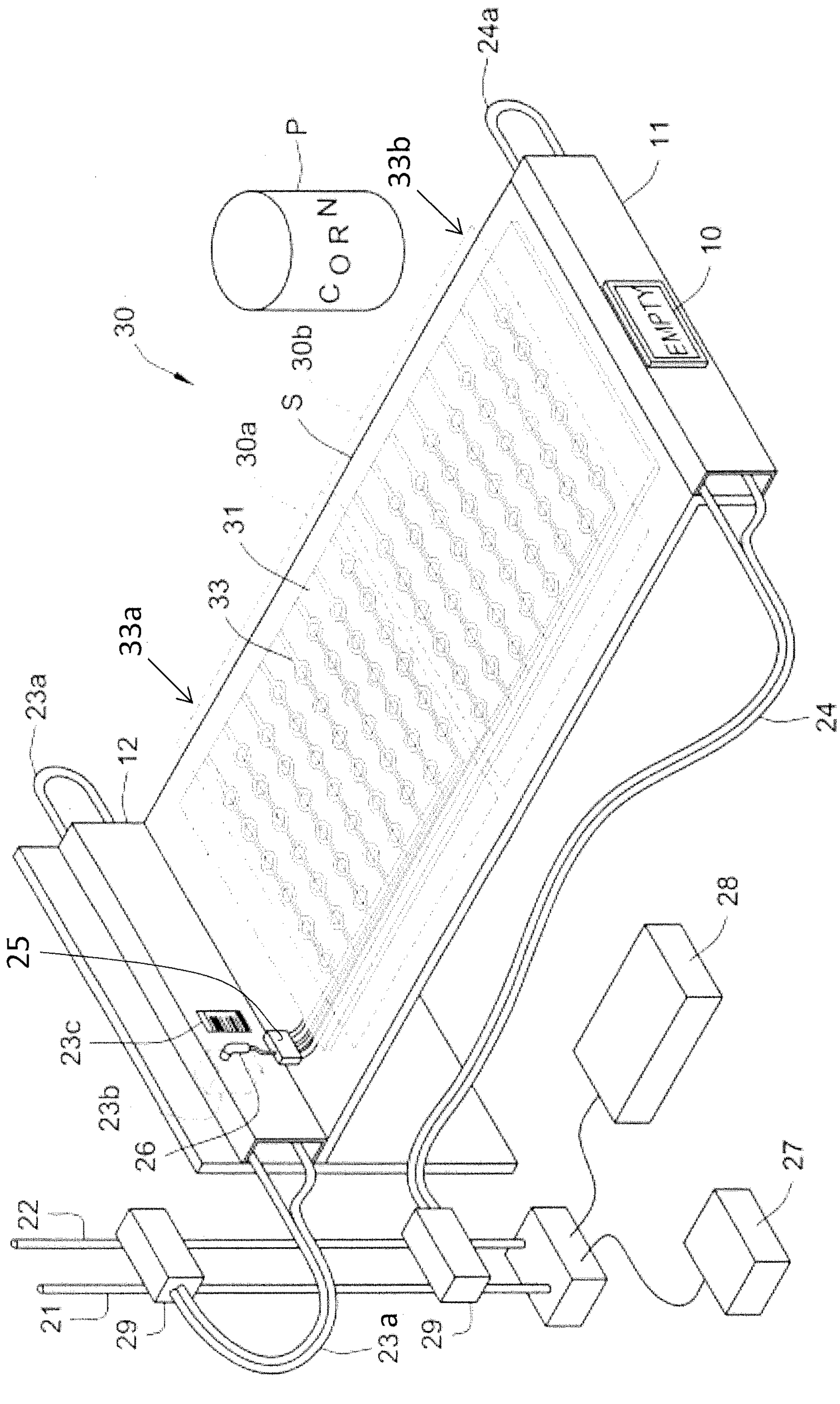
FIG. 2 is an enlarged front perspective of one segment of one of the shelves in the system of FIG. 1.

With reference to FIG. 2, the rear loop 23*a* may be coupled to multi-turn coils 23*b* spaced along the interior of the rear rail 12. Each of the coils 23*a* in the rear rail 12 may be coupled to an adjacent socket in the rail 12 for receiving a jack 26, which in turn is attached to a connector 25 that receives electrical leads from one or more weight sensors 30 on an adjacent area of the top surface of a shelf S. In the illustrative embodiment, the connector 25 receives four leads, two from a first sensor 30*a* on a rear region 33*a* of the adjacent shelf area, and two from a second sensor 30*b* on a front region 33*b* of the adjacent shelf area. The four leads may be used to supply power to the sensors 30*a* and 30*b*, and also to monitor the electrical current flowing through each sensor for detecting when the shelf areas covered by the respective sensors 30*a* and 30*b* have products on them, as discussed in detail below. The present disclosure may have sensors having multiple regions of different sizes and dimensions which can be established using various physical and electrical connections and/or separations between the regions. In another embodiment a single sensor may be selectively divided into regions through a programmable processor.

Rear rail 12 may include a UPC label 23*c* which uniquely identifies the weight sensor 30 in use at that shelf S. This UPC label 23*c* can be used to link the weight sensor 30 with the specific product P stocked on the weight sensor 30. Controller 28, or a similar computer processor, maintains a database of unique weight sensor 30 identifiers, printed on UPC label 23*c*, and the products P stocked thereon.

Figure 3:
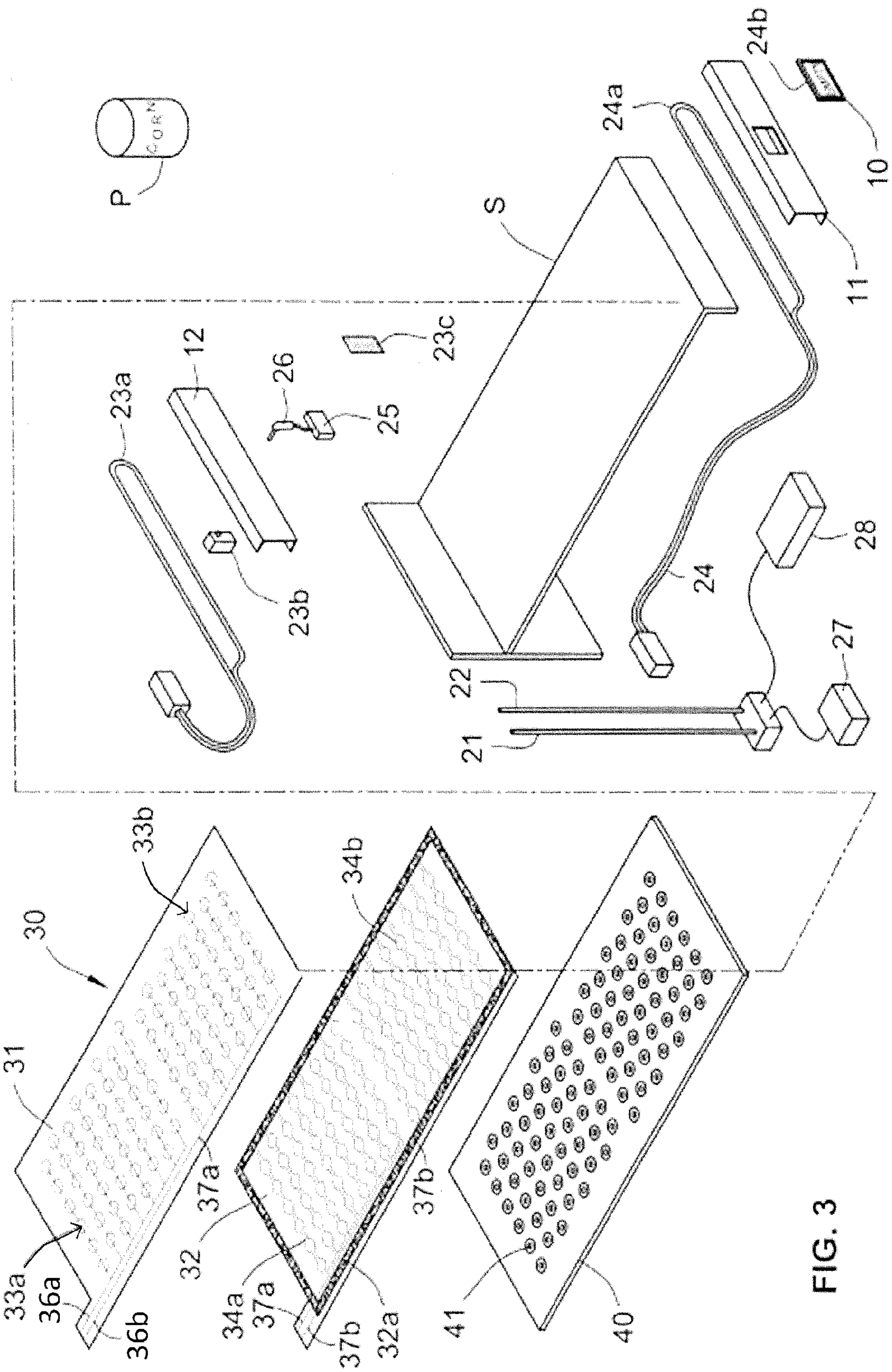
FIG. 3 is an exploded perspective of the shelf segment shown in FIG. 2.

With reference to FIG. 3, the front loop 24*b* may be coupled to multi-turn secondary windings 24*b* on the rear sides of the electronic shelf labels 10 on the front rail 11. Each electronic shelf label 10 may include a display that is powered by the coil 24*b* on that label, and may be controlled by communication signals received via the coil 24*b* to display the price and other information related to the product P on the adjacent portion of the shelf S. In FIGS. 2 and 3, the product P is illustrated as cans of corn, as an example.

Each weight sensor 30 may include a laminate of two flexible sheets 31 and 32, such as plastic or fabric sheets, printed with patterns of a conductive material, such as aluminum. The two sheets 31 and 32 may be bonded together by adhesive 32*a* or other fastening means. The conductive patterns may be positioned on the lower surface of the upper sheet 31 and the upper surface of the lower sheet 32, so that they are directly opposite each other, on the opposed surfaces of the two sheets 31 and 32. As can be seen in FIGS. 2 and 3, the conductive patterns on both of the two sheets 31 and 32 form multiple rows of interconnected disc-shaped contacts 33 and 34, respectively, that cooperate with each other to form multiple pairs of opposed contacts. These contacts may be normally open, but can be closed by flexing one or both of sheets 31 and 32 to bring the contacts into engagement with each other. Different sizes and shapes for the conductive pattern may be used and can be selected as a function of the size and weight of the product to be placed on the sensor, and different materials may be selected for the conductive material so long as it is able to flex with the sheet it is embedded in.

Disc-shaped contacts 33 and 34 are arranged in rows on flexible sheets 31 and 32. Each row is connected to an electrical lead which is connected to connector 25. Rows of contacts are divided into regions: a rear region of first contacts 33*a*, a front region of first contacts 33*b*, a rear region of second contacts 34*a*, and a front region of second contacts 34*b*.

As illustrated in FIG. 3, each region of weight sensor 30 has a unique pair of electrical leads. Rear region 33*a*, 34*a* are connected to electrical leads 36*a* and 37*a*, respectively. Front region 33*b*, 34*b* are connected to electrical leads 36*b* and 37*b*, respectively.

Figure 4:
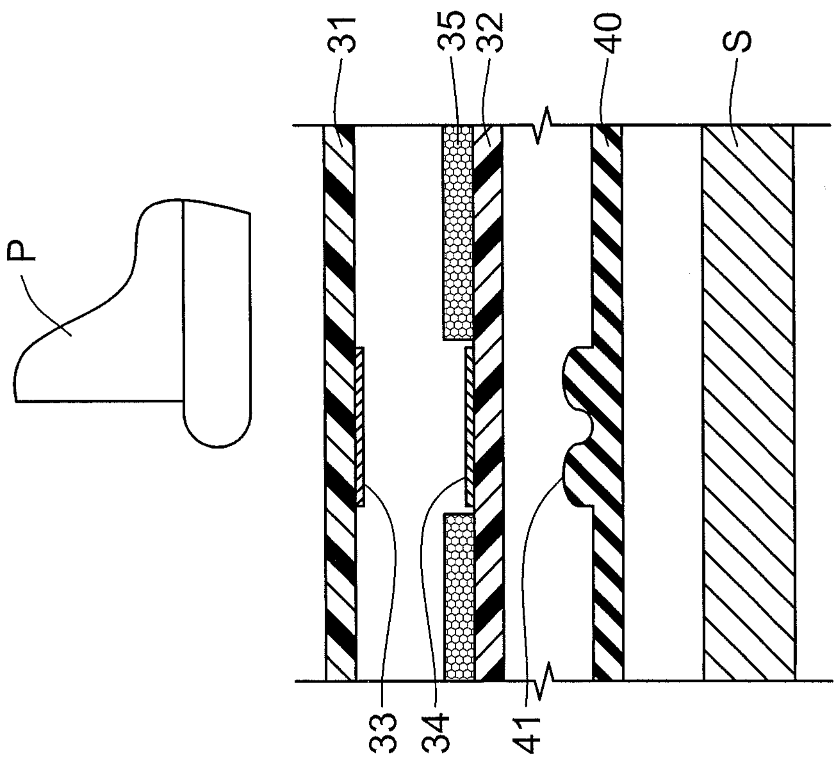
FIG. 4 is an enlarged and exploded vertical section of one of the sensing areas in the out-of-stock sensor included in the shelf segment shown in FIGS. 1-3.
Figure 6:
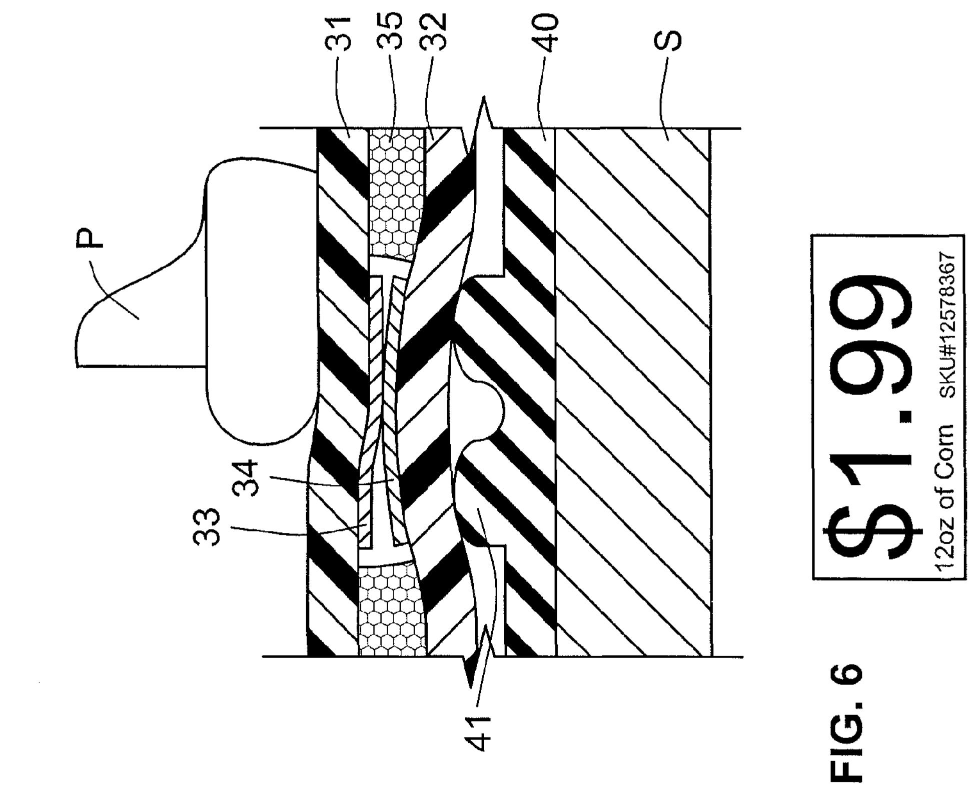
FIG. 6 is the same vertical section shown in FIG. 5, with the electrical contacts in the sensing area in their closed positions.
Figure 5:
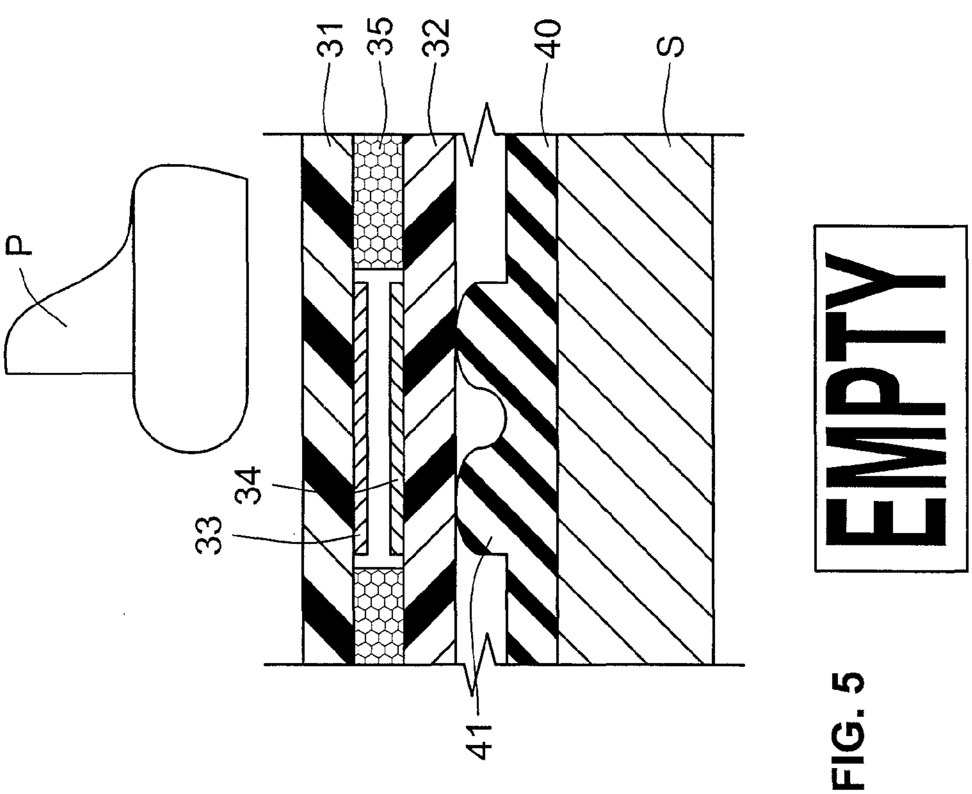
FIG. 5 is a further enlargement of the central portion of the vertical section shown in FIG. 4, not exploded and with the electrical contacts in the sensing area in their open positions.

With reference to FIG. 4, a third layer 35, in some embodiments formed of plastic foam, maintains a space between the opposed conductive contacts when the sheets 31 and 32 are in their normal, unflexed condition. The third layer 35 has multiple apertures that are aligned with the contacts 33 and 34 to permit those contacts to be moved into and out of engagement with each other, as can be seen in FIGS. 4-6. Other suitable types, sizes and shapes of the spacer material may be used so long as the spacer material does not interfere with the operation of the contacts.

Beneath the lower sheet 32 is a bottom sheet 40 which rests on the top surface of the shelf S. Bottom sheet 40 forms multiple raised annular biasing regions 41 on its upper surface, with each annular biasing region 41 cooperating with at least one of the conductive contacts 34 on the lower sheet 32 to bias the conductive contact 34 on the lower sheet 32 towards the conductive contact 33 on the upper sheet 31 when a product is placed on the sensor. The biasing regions increase the sensitivity of the sensor to allow it to differentiate between products having only slight difference in weight (approximately tenths of an ounce). The size and shape of the biasing region may be selected as a function of the size and shape of the conductive contacts, the spacer material, the top and bottom sheet material, and the desired sensitivity of the sensor.

FIG. 5 shows the positions of the contacts 33 and 34 and the annular biasing regions 41 when there is no product P resting on this particular pair of contacts, so there is no weight applying downward pressure on the sensor. It can be seen that the contacts 33 and 34 are spaced apart from each other, so that no electrical current can flow across this particular pair of contacts when no product is present.

FIG. 6 illustrates the change that occurs when a product P is resting on the upper surface of the laminate in the location of this particular pair of contacts. It can be seen that the weight of the product P bearing down on the laminate presses the sheets 31 and 32 downwardly against the raised annular biasing region 41 of the bottom sheet 40, which cause the sheet 32 to be flexed upwardly, thereby raising the lower contact 34 into engagement with the upper contact 33 to form an electrical path. This closes the "switch" formed by the contacts 33 and 34, and thus electrical current flows across through this pair of contacts, indicating that the product P is present in this region of this particular shelf S.

As long as a product P is resting on a shelf somewhere within the area covered by any given weight sensor (e.g., weight sensor 30*a*), current will be conducted through at least one pair of contacts 33 and 34 in that sensor. For example, when the voltage across the leads to each sensor is 3.3 volts, the current through a 200K-ohm pull-up resistor is 17 μA, and this current through each sensor can be separately monitored by the controller 28 connected to the conductor loop 23 via the conductors 21 and 22. The presence of the current in any given sensor indicates that the shelf area covered by that sensor is not out of stock.

When all the contact pairs 33, 34 in that shelf area are open, the controller 28 detects no current flow through that weight sensor 30, which indicates that shelf area is out of stock, and the controller 28 can generate an alert signal indicating an out-of-stock condition. This alert signal may, for example, be transmitted to the electronic shelf label 10 corresponding to this particular shelf location to cause that electronic shelf label 10 to display "EMPTY," as illustrated in FIG. 5, or another appropriate message. In some embodiments, electronic shelf label 10 includes at least one indicator light which energizes upon receiving the alert signal to indicate a product is out of stock. The alert signal can also be transmitted to a central controller or computer to alert store personnel at a central location that an out-of-stock condition exists at this particular shelf location. The alert signal can be implemented using email, text messages, phone calls, and computer notifications. In some embodiments the alert signal provides notification when the inventory of a retail product on the store's shelf falls below a predetermined number, so that store employees can re-stock the product before it becomes out of stock on the shelf.

It will be understood that the controller 28 can be programmed to generate an out-of-stock condition in response to the detection of a zero-current condition in any single weight sensor 30, or any combination of weight sensors 30 covering a shelf area allocated to the same product. Thus, the alert signal can indicate an out-of-stock condition for any desired shelf area or any desired product, depending upon how the controller 28 is programmed.

Figure 7:
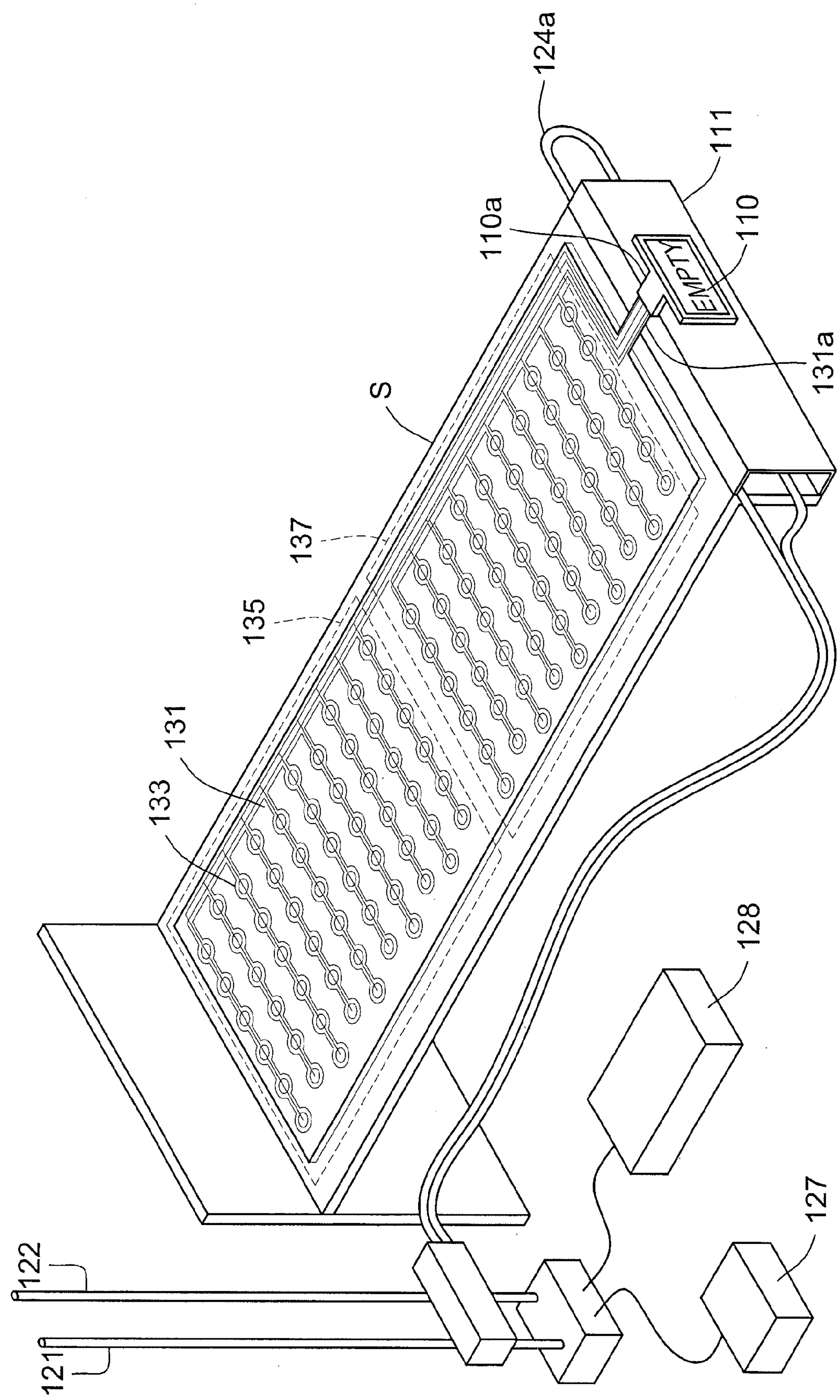
FIG. 7 is a front perspective similar to that shown in FIG. 2, with a modified version of the out-of-stock sensor.

FIG. 7 illustrates an alternative arrangement that requires only the front conductor loop 124*a*, ending along the length of the interior of the front rail 111. This loop 124*a* is coupled to a power supply 127 and a controller 128 via coupler 129 and a pair of vertical conductors 121 and 122. A pair of sensors 130*a* and 130*b* cover respective front and rear sections of the illustrated shelf area, but the leads for these two sensors are located at the front edge of the shelf S, where those leads are plugged into a jack 110*a* on the back of the electronic shelf label 110. This arrangement eliminates the need for a rear rail on the shelf, because all the electrical power and communication signals, to and from sensors 130*a*, 130*b* and the electronic shelf label 110, are transmitted via the single primary winding formed by the loop 124*a* and the secondary winding on the back of the electronic shelf label 110.

In the above-described embodiments, the weight sensor 30 is configured to be in either a 'closed' state—meaning retail products are on the sensor and the sensor senses their weight—or an 'open' state—meaning there is no weight on the sensor and indicating an out-of-stock product. In further embodiments, weight sensor 30 is configured to provide more detailed information to an inventory management system. For example, by measuring the weight of retail products on the shelf and knowing the weight per product, the sensor provides an inventory management system with a count of the retail products on a shelf. In some embodiments, weight sensor 30 is accurate to 0.1 oz.

Figure 8:
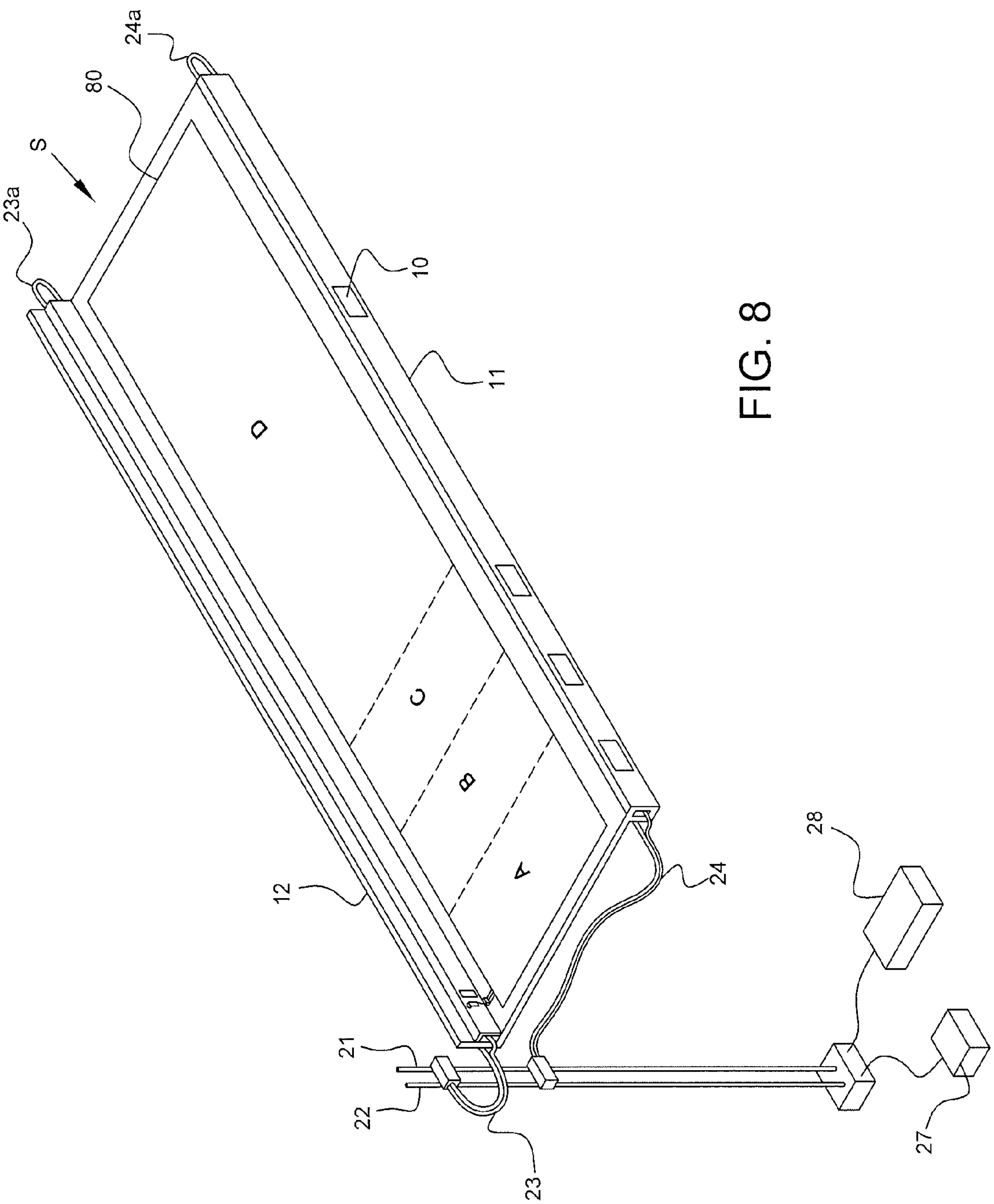
FIG. 8 is a simplified illustration of one embodiment of the present disclosure of a sensor with multiple programmable regions.

In some embodiments, the weight sensor is programmable to be divided into discrete regions. FIG. 8 shows a weight sensor 80 divided into regions A, B, C, and D. Controller 28 assigns parameters to each region based on the retail product that will be stocked in that region. Weight sensor 80 thus serves to monitor inventory of multiple retail products simultaneously. As discussed in more detail below, regions A, B, C and D each may be assigned different products, and an electronic shelf label 10 may be associated with each region to provide pricing and product information for the products on its associated region.

In one embodiment, the sensor may employ circuitry which produces a signal representative of the weight of the products placed on the sensor. Circuitry suitable for such measuring include variable resistive elements and strain gauges. In operation, a region of the sensor can be identified for a specific product. For example, the inventory system may include a database of product specific information including universal product codes (UPC), product numbers, individual weight of the product, source or manufacturer, expiration date, and pricing information. A user interface can be used to identify the product that is associated with the sensor region.

Figure 9:
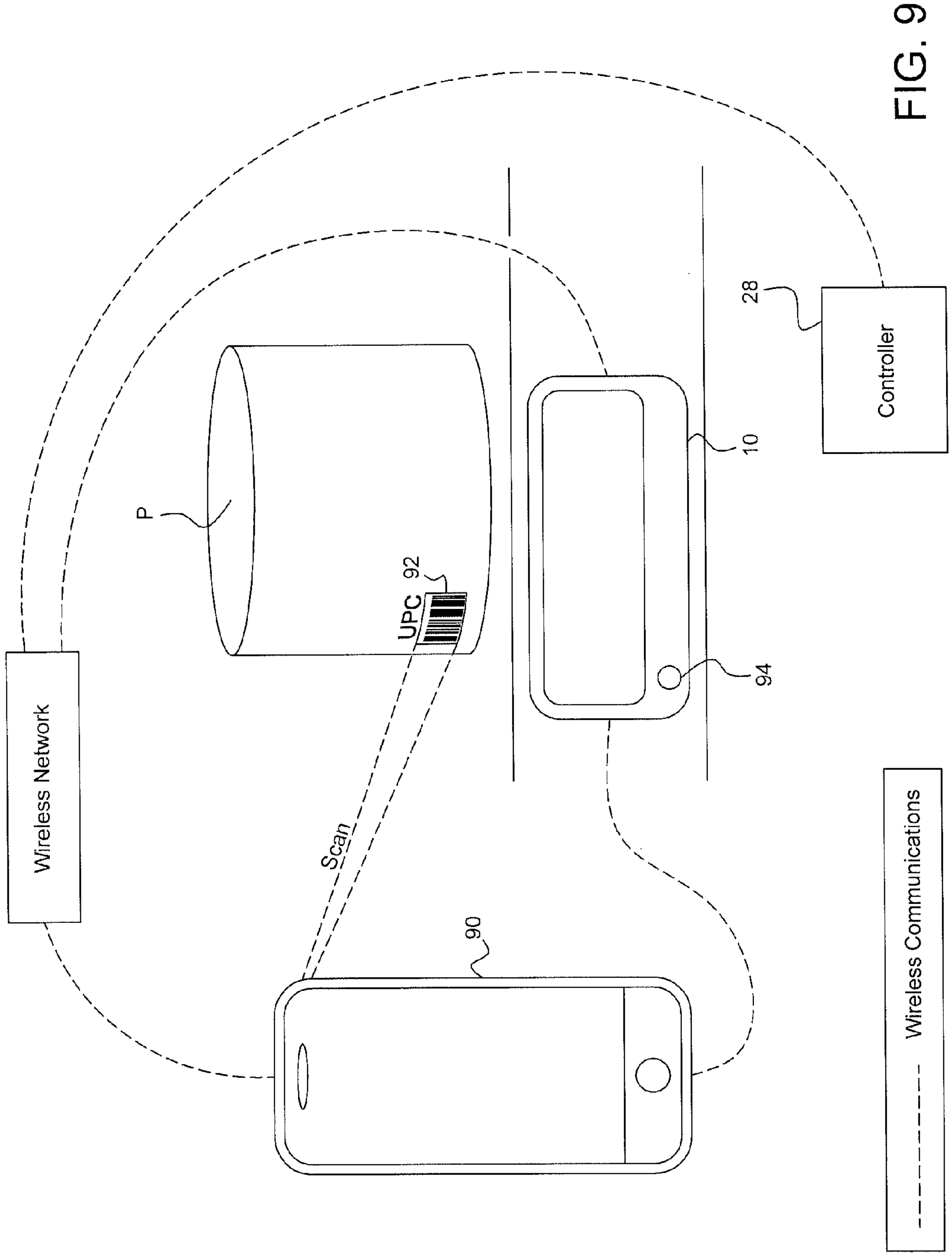
FIG. 9 is a simplified illustration of one embodiment of the present disclosure of a programmable shelf label.

In one embodiment, such as that illustrated in FIG. 9, electronic shelf label 10 includes functionality to scan the UPC bar code 92 contained on a product P. The electronic shelf label 10 may be in communication with the product database and can access the individual weight associated with the product specified for that region. Electronic shelf label 10 may have functionality to determine an inventory of the products contained in the region using the measured total weight from the sensor and the individual weight of the product. The inventory count may be displayed on the electronic shelf label 10. The individual inventory count functionality may reside in the electronic shelf label 10, in the controller 28, or in a separate designated processor, or the functionality may be distributed among various components of the system. For example, a mobile device 90 (e.g. —a smart phone or other mobile or portable device) may be used as a user interface to communicate with the electronic shelf label 10, or controller 28 to identify the product P for a specific region of the sensor. The mobile device 90 may have scanning technology to automatically capture the UPC bar code 92, or the mobile device 90 may receive manual input from the user to identify the product for each sensor region.

An additional advantage of a weight sensor 30 configured to measure the weight of retail products placed upon it is that controller 28 is programmed to identify when a retail product of a weight different than the weight of assigned retail products has been placed on a weight sensor 30. Controller 28 is then able to alert store employees when a retail product has been placed in the wrong area of a shelf either by a stockperson or a customer. For example, if a sensor region is assigned to cans of chicken noodle soup and the product information database indicates that each can of soup weighs 132 grams, electronic shelf label 10 or controller 28 may have circuitry to identify when a product that does not weigh 132 grams is placed on its associated sensor region, e.g., a can of beans weighing 285 grams. The electronic shelf label 10 or controller 28 may also have circuitry to issue an alert of a potential inventory out of place to remotely and automatically notify a store employee of the situation. In another embodiment, the electronic shelf label 10 may include a local indicator 94 such a flashing light or color coded light on the electronic shelf label 10. The local indicator 94 may integrate out of stock, out of place, and low inventory or low stock indications. For example, the indicator light may illuminate yellow if the inventory for the associated region is less than a "low inventory threshold", it may illuminate red for an out of stock situation, and may flash blue for an out of place inventory.

In some embodiments, the local indicator 94 may be used as an aid to store employees when stocking or restocking retail products to the shelves. An employee scans the UPC bar code 92 of product P that is to be placed on a shelf using a mobile device 90 (e.g. —a smart phone or other mobile or portable device). Mobile device 90 communicates with controller 28 or with electronic shelf label 10, which then cause the local indicator 94 to illuminate in a specified color, indicating to the employee the correct location of the product P. In some embodiments the local indicator 94 may flash or blink to draw the attention of the store employee. In some embodiments the screen of the electronic shelf label 10 will illuminate, flash, or blink to draw the attention of the store employee. This use of the local indicator 94 has the advantage of speeding the process of stocking or restocking retail products by eliminating the need for the store employee to search for the correct location of a retail product. Similarly, this use of the local indicator 94 reduces the frequency of retail products being stocked to the wrong location on a shelf.

In some embodiments, indicator lights are further used to assist customers during shopping. A customer creates a shopping list using a smartphone, tablet, or similar electronic device. Upon entering a retail store, the shopping list is activated and communicates wirelessly with electronic shelf labels 10 or controller 28. As a customer proceeds down an aisle of the retail store, one or more indicator lights of an electronic shelf label 10 associated with a product on the shopping list will illuminate, flash, or otherwise indicate to the customer the location of the desired product.

Figure 10A:
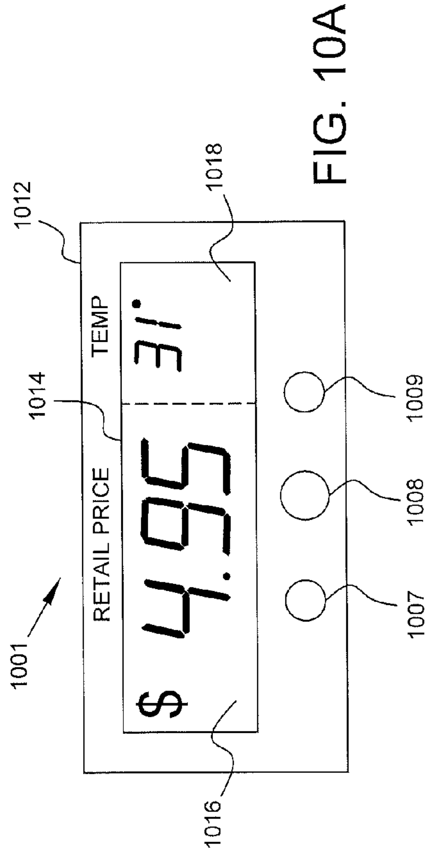
FIGS. 10A and 10B are simplified illustrations of some embodiments of the present disclosure of programmable shelf labels.
Figure 10B:
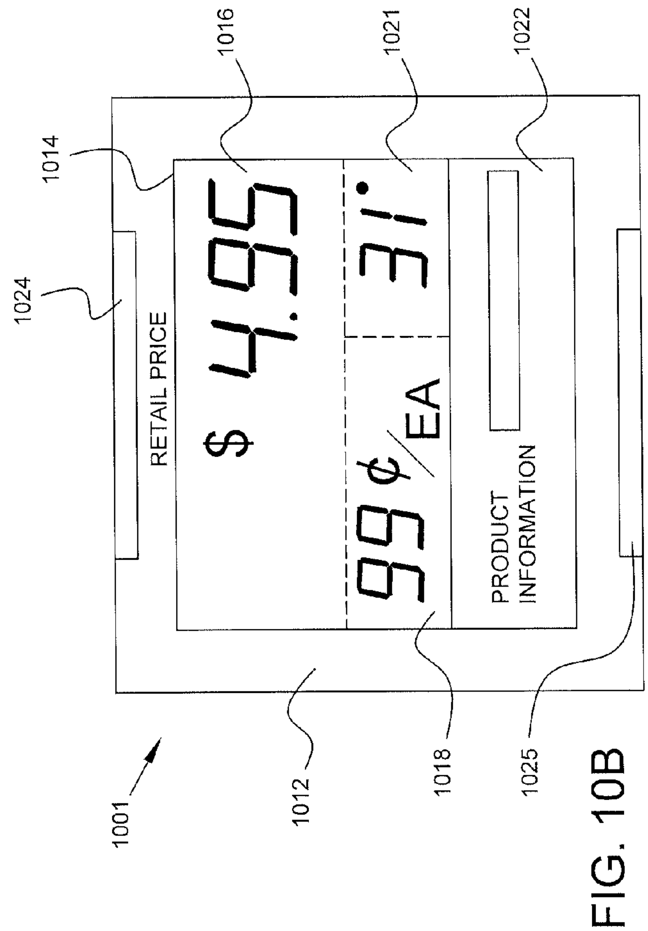

FIGS. 10A and 10B illustrate alternative embodiments of an electronic shelf label (ESL) which may be used with the present disclosure. In FIG. 10A, ESL 1001 comprises various electronic elements disposed within a casing 1012. A display 1014 is disposed on the front face of the ESL 1001 and is divided into a primary display area 1016 and secondary display area 1018. The front face of ESL 1001 further includes a first indicator light 1007, second indicator light 1008, and third indicator light 1009. In some embodiments, the indicator lights 1007, 1008, and 1009 comprise LEDs. In some embodiments, the indicator lights 1007, 1008, and 1009 are green, amber, and red, respectively, which may indicate adequate, low, and out of stock inventory levels, respectively.

At least one or any combination of indicator lights 1007, 1008, and 1009 can be used in place of local indicator 94 described above to assist store employees when stocking or restocking retail products to the shelves. In some embodiments at least one or any combination of indicator lights 1007, 1008, and 1009 may flash or blink to draw the attention of the store employee. Additionally, in some embodiments display 1014 will illuminate, flash, or blink to draw the attention of the store employee.

In FIG. 10B, the display 1014 of ESL 1001 includes primary display area 1016, secondary display area 1018, and tertiary display area 1021. Product information and UPC are displayed on the ESL 1001 via a product information label or display area 1022. A first indicator light 1024 is disposed at the top of front face of ESL 1001 and second indicator light 1025 is disposed at the bottom of front face of ESL 1001. As above, first indicator light 1024 and second indicator light 1025 can be used in place of local indicator 94 described above to assist store employees when stocking or restocking retail products to the shelves. In some embodiments at least one or any combination of first indicator light 1024 and second indicator light 1025 may flash or blink to draw the attention of the store employee. Additionally, in some embodiments display 1014 will illuminate, flash, or blink to draw the attention of the store employee.

In still further embodiments, the weight-sensing apparatus described above is adapted to the unique methods of retail display to additionally indicate out of stock products and track inventory of retail products. Retail displays including peg hooks, product pushers, wire baskets, clothing rods, display racks, and hangars are integrated with weight sensors to detect when an product is out of stock or to maintain an at-the-shelf inventory.

In some embodiments, controller 28 includes a computer processor with software for real-time inventory monitoring. When a product becomes 'out of stock'—that is, the last of a type of product is removed from a shelf S as sensed by the weight sensor 30—the controller 28 records the date and time of the status change. Similarly, when a product is restocked at the shelf, the controller 28 records the date and time of the status change. Using such information, controller 28 can produce a report for retailers which details the average product out of stock time, time to restock, longest restock time, and the like. The report can also include a percentage of retail store products that are out of stock at a given time or date, or an average out of stock percentage over a given time period.

The weight sensor provides the computer processor with real-time inventory of retail products on the shelves and the computer processor calculates the sell rate or depletion rate of said retail products. Using this depletion rate, the frequency of the need to re-stock said retail products is calculated by the controller, allowing employees to be notified to preemptively re-stock retail products before they become out-of-stock. As an example, the controller is able to calculate low inventory thresholds for the shelves based on depletion rates and provides an alert to store employees indicating the product is likely to become out of stock shortly. This alert prompts store employees to re-stock the product.

The depletion rate can also be used to evaluate the success of various retail product promotional programs. Many retail stores use special shelving displays, eye catchers, and advertisements—both at the shelf and in circulars—to attempt to drive up sales of certain products. If a retail product is sold at two different locations in a store, such as in its normal shelf location and at a special display area, the system provided can measure the depletion rates of this retail product at both locations for comparison to determine the effectiveness of the special display area.

Similarly, the depletion rates of a single retail product can be compared across time. The system can determine the depletion rate in a first week, when an product is not on sale and compare it to the depletion rate in a second week when the product is on sale to determine the effectiveness of sales or promotions. Or the depletion rate of a retail product can be compared from day to day or even hour to hour to better understand sales trends. For example, a certain retail product may be found to sell at a higher rate on weekends, and thus the system may be programmed to issue alerts to prompt store employees to ensure the product is properly stocked on Thursday or Friday rather than waiting for the standard re-stock day on Sunday. In one embodiment, the system can automatically adjust a low inventory threshold as a function of a date or time of day to ensure that sufficient inventory is available for the anticipated demand as a function of the historical depletion rate for the product. Thus, the system is able to maintain historical data for depletion rates for specific products for specific locations for specific dates and times. Historical data from one retail store can be used to identify trends and can be compared against the historical data from other stores to identify anomalies or areas of concern.

In further embodiments, the system is an at-the-shelf stocking optimizer used to prevent over-stocking of retail products on the shelves of retail stores. The depletion rate is calculated in the manner described above and further used to determine the optimal inventory of retail products on the shelves. The optimal inventory may be calculated automatically based on the depletion rate and restocking cycle. The optimal inventory may be determined by multiplying the depletion rate of a product by the desired or scheduled re-stock rate. For example, if a retail store performs a re-stock of all retail products on its shelves twice a week, the depletion rate can be used to determine how many products should be placed on the shelf at each re-stock to avoid over-stocking the product. As discussed above, over-stocking of retail products at the shelf carries significant inventory costs to retailers. Calculating the optimal inventory of a retail product can free up shelf space for other products and prevent the need to keep higher-than-necessary product inventories in the store's warehouse or storage area and on the store's shelves. Thus, the present disclosure can assist retailers in optimizing their available shelf space.

In further embodiments, the system described above is integrated into an electronic shelf label system, the inventory control system can further provide a dynamic pricing system that will calculate optimal prices for retail products. Given a known inventory of a retail product, the frequency of re-stocking said retail product, and the depletion rate of said retail product, a retail product's price can be adjusted in real time to best match supply and demand of that product. In one embodiment, product database may include pricing levels based on available inventory. As the inventory is depleted, a processor can automatically adjust the price of the inventory on the shelf as reflected in the product database and electronic shelf label 10 will automatically reflect the new pricing.

In some embodiments, electronic shelf labels 10 are used in the back storeroom of a retail store as well as the front retail space. Electronic shelf labels 10 in the storeroom can be linked to electronic shelf labels 10 assigned to the same product located in the front retail space. By creating such a link using controller 28, an electronic shelf label 10 in the back storeroom associated with Product A will illuminate its indicator light when the Product A in the front retail space becomes out of stock as sensed by associated weight sensor 30, providing a visual indication to a retail store employee that Product A needs to be restocked. Once Product A is restocked, as sensed by associated weight sensor 30, indicator light on the electronic shelf label 10 in the back storeroom will turn off.

In some embodiments, the disclosed system is further integrated with a product ordering system. Controller 28 can produce out of stock reports which can be automatically imported into such a product ordering system for ease of ordering replacements. Additional reports are achievable through such integration. For example, a report may indicate which, if any, products in stock on a retail stores shelves are subject to a recall or discontinuation.

In some embodiments, the disclosed system is used to evaluate products for expiration. The database connected with controller 28 includes product-specific information such as expiration date. Controller 28 reviews expiration dates to generate a report of all products which are stocked at the shelf beyond their expiration date. In some embodiments, indicator lights are illuminated to aide store employees in locating expired products. In some embodiments, a report of expired products is sent on a periodic basis to store personnel. In some embodiments, an alert associated with expired products is generated by controller 28.

Figure 11:
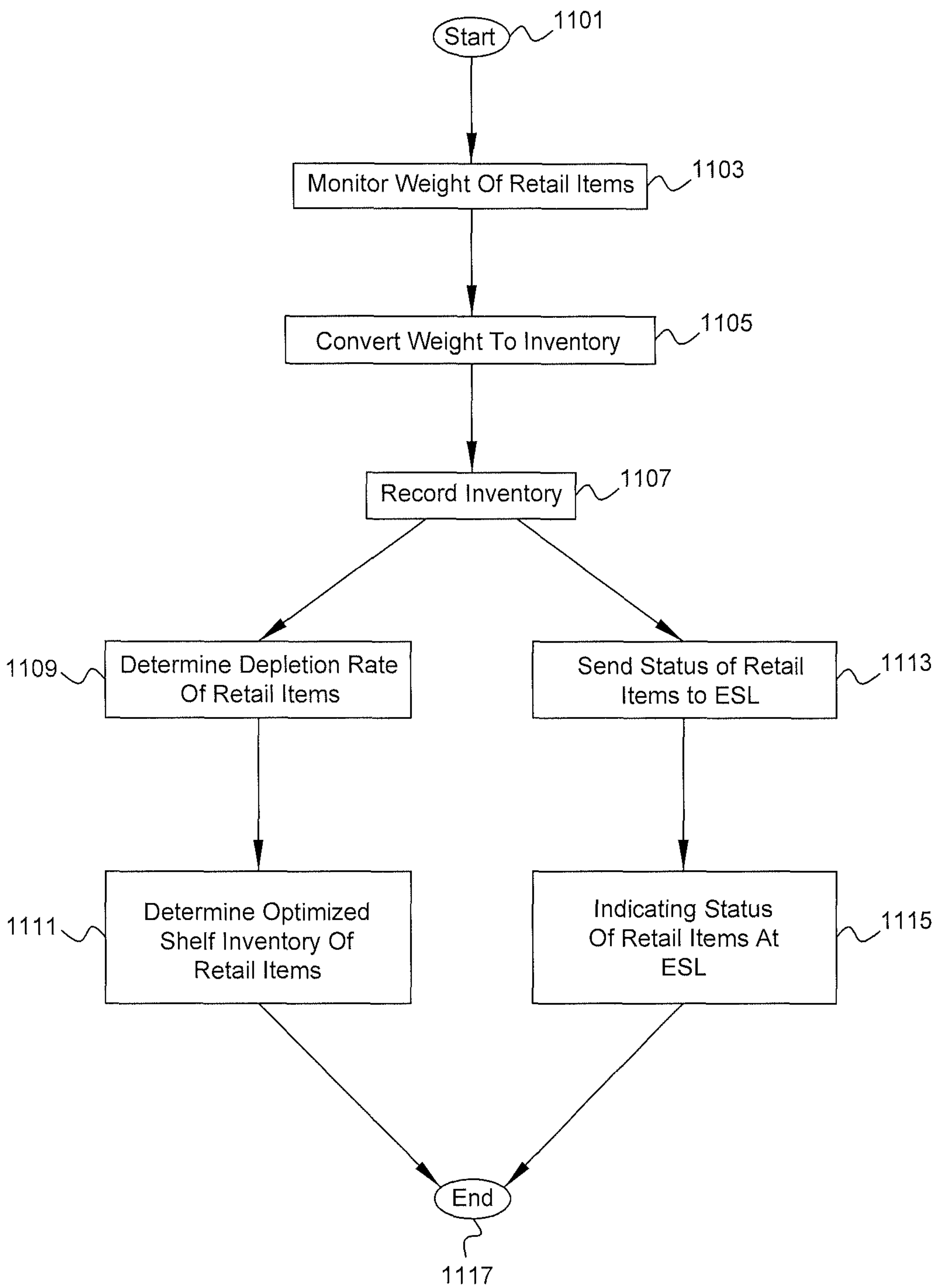
FIG. 11 is a flow chart of a method of inventory control in accordance with some embodiments.

The present disclosure further provides a method for monitoring inventory of a retail item at the shelf FIG. 11 provides a flow chart for such a method. The method begins at block 1101. The weight of retail items is monitored by a sensor at block 1103, and at block 1105 the measured weight is converted to an inventory of the retail items based on the individual weight of a retail item. This inventory of the retail item being, monitored is recorded at block 1107.

At block 1109, a depletion rate is determined for the retail items by monitoring inventory over a predetermined period of time. This depletion rate is used at block 1111 to calculate an optimized shelf inventory. The optimized shelf inventory is determined using the depletion rate and a predetermined frequency of re-stocking a retail item at the shelf. As discussed above, optimized shelf inventory is desirable to prevent both over- and under-stocking a retail item.

At block 1113 the status of the retail item is sent to the ESL associated with that retail item. The status can be in stock, low stock or low inventory, or out of stock. At block 1115 the ESL indicates the status of the retail item. The method ends at block 1117.

In some embodiments, the inventory of a retail product or the depletion rate of a retail product are sent to a remote location (i.e. a location outside the retail store). For example, the inventory or depletion rate or a retail product can be sent to a central processor, a corporate headquarters, a supply chain warehouse, a manufacturing facility, or a third party monitoring facility. The dissemination of inventory and depletion rates can be used to improve supply chain management and inventory planning.

Thus, the disclosed apparatus and system provide a comprehensive inventory control system for retail products. A weight sensor placed on retail shelves and a controller together monitor real-time at-the-shelf inventory of retail products and provide out-of-stock alerts, low inventory alerts and out of place inventory alerts. The controller may calculate a depletion rate for each retail product, allowing the system to anticipate out-of-stocks and alert employees to pre-emptively re-stock the product. The controller further is capable of evaluating depletion rates across locations within a store and across time. By collecting this data, required inventory—both at the shelf and in a store's warehouse—may be calculated. Finally, dynamic pricing is enabled by the inventory control and electronic shelf label systems. The product database can maintain historical data for each product based on shelf location and can assist in defining new metrics and identify trends that may be used to further optimize inventory control and shelf space availability.

The present disclosure can be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, PDA or phone.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or other monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A system for inventory control, comprising a weight sensor disposed on a shelf in a retail environment, comprising:

a first laminate sheet, having an exterior surface and an interior surface, wherein a plurality of first contacts are affixed to the interior surface of the first laminate sheet;

a second laminate sheet, having an exterior surface and an interior surface, wherein a plurality of second contacts are affixed to the interior surface of the second laminate sheet, and wherein each one of the plurality of second contacts is aligned with one of the plurality of first contacts to form an opposing contact pair;

a spacer layer disposed between the first laminate sheet and the second laminate sheet having a plurality of apertures, each one of the plurality of apertures aligned with one opposing contact pair;

a plurality of raised annular biasing regions, each one of the plurality of raised annular biasing regions aligned with one opposing contact pair, wherein the first contact and the second contact of an opposing contact pair are moved into engagement with each other when a predetermined weight is applied to the exterior surface of the first laminate sheet;

a power and communications distribution system for providing power to the weight sensor, the power and communications distribution system comprising:

a tag area controller, adapted to receive a first signal from the weight sensor indicating the presence of an object disposed on the weight sensor;

a primary distribution loop connected to the tag area controller; and an inductively coupled connection between the primary distribution loop and the weight sensor;

wherein each opposing contact pair is programmably assigned by the tag area controller to a sensing region capable of variable sizing based on which opposing contact pairs are programmably assigned by the tag area controller to the sensing region, each weight sensor having at least two sensing regions and each sensing region is associated by the tag area controller with a specific object to be weighed; and wherein each of the at least two sensing regions is associated at the processor with an electronic shelf label.

2. The system of claim 1 further comprising:

a memory storage device coupled to the tag area controller, wherein the memory storage device includes the individual weight of an object; and wherein the tag area controller is programmed to determine the amount of objects on the weight sensor as a function of a second signal received from the weight sensor and individual weight information for the object retrieved from the memory storage device.

3. The system of claim 2, further comprising:

the tag area controller is programmed to generate a signal indicating the amount of objects on the weight sensor.

4. The system of claim 3, further comprising:

the tag area controller is programmed to generate a signal indicating a misplaced stock condition if the determined amount of objects is not a whole number.

5. The system of claim 1, wherein the tag area controller generates an alert signal when each of the first contacts and the second contacts of the opposing contact pairs of a sensing region are moved out of engagement with each other.

6. The system of claim 5, further comprising an electronic shelf label operatively connected to the tag area controller, wherein the electronic shelf label provides a visual or aural indication of the alert signal generated by the tag area controller.

7. The system of claim 6, wherein the weight sensor measures the weight of an object with an accuracy of about 0.1 oz.

8. The system of claim 1, wherein the plurality of raised annular biasing regions are affixed to a third laminate sheet which is disposed between the shelf and the second laminate sheet.

9. The system of claim 3 wherein the amount of objects on the weight sensor is sent to a remote location.

10. A system for inventory control, comprising a weight sensor disposed on a shelf in a retail environment, comprising a plurality of opposing contact pairs disposed between two laminate sheets and aligned with one of a plurality of annular biasing regions, wherein the contacts of an opposing contact pair are moved into engagement when weight is applied to one or more of the laminate sheets;

a power and communications distribution system comprising:

a primary distribution loop coupled to a power source; and a connector inductively coupled to the weight sensor to provide power from the primary distribution loop to the weight sensor;

a processor inductively coupled to the primary loop and adapted to receive a signal from the weight sensor via the primary loop indicating the total weight of objects disposed on the weight sensor;

wherein each of the plurality of opposing contact pairs is programmably assigned to a sensing region by the processor, such that each weight sensor has at least two sensing regions and each sensing region is capable of variable sizing based on which opposing contact pairs are programmably assigned to said sensing region by the processor; and wherein each of the at least two sensing regions is associated at the processor with an electronic shelf label which is inductively coupled to the primary loop.

11. The system of claim 10, wherein the processor generates an alert signal when the signal from the weight sensor indicates a total weight of zero.

12. The system of claim 11, wherein the electronic shelf label provides a visual or aural indication of the alert signal generated by the processor.

13. A method of inventory control, comprising:

providing a weight sensor disposed on a shelf in a retail environment, the weight sensor comprising a plurality of opposing contact pairs disposed between two laminate sheets and aligned with one of a plurality of annular biasing regions, wherein the contacts of an opposing contact pair are moved into engagement when weight is applied to one or more of the laminate sheets, and wherein each of the plurality of opposing contact pairs is programmably assigned to a sensing region by a processor in communication with the weight sensor, and wherein each sensing region is capable of variable sizing depending on which opposing contact pairs are programmably assigned to the sensing region by the processor and is associated with an electronic shelf label;

in the processor, determining the total weight of objects placed on the weight sensor;

accessing a memory storage device, the memory storage device coupled to the processor and containing information specific to an object disposed on the weight sensor, including the individual weight of an object; and in the processor determining an amount of objects on the weight sensor as a function of a signal received from the weight sensor and the individual weight information for the object retrieved from the memory storage device;

wherein weight sensor has at least two sensing regions.

14. The method of claim 13, further comprising:

generating an alert signal when the amount of objects is below a predetermined threshold.

15. The method of claim 14 wherein the alert signal is indicated visually or aurally at an electronic shelf label.

16. The method of claim 15 wherein the alert signal is sent to a remote location.

* * * * *